(12) United States Patent
Ueno et al.

(10) Patent No.: US 9,946,311 B2
(45) Date of Patent: Apr. 17, 2018

(54) DISPLAY CONTROL DEVICE

(75) Inventors: Masatoshi Ueno, Kanagawa (JP);
Shinobu Kuriya, Kanagawa (JP);
Kenichi Kabasawa, Saitama (JP);
Toshiyuki Nakagawa, Kanagawa (JP);
Tetsuro Goto, Tokyo (JP); Tsubasa Tsukahara, Tokyo (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 13/608,316

(22) Filed: Sep. 10, 2012

(65) Prior Publication Data

US 2013/0088421 A1 Apr. 11, 2013

(30) Foreign Application Priority Data

Oct. 6, 2011 (JP) .................................. 2011-221540

(51) Int. Cl.
*G06F 1/16* (2006.01)

(52) U.S. Cl.
CPC .... *G06F 1/1694* (2013.01); *G06F 2200/1637* (2013.01)

(58) Field of Classification Search
CPC ............ G06F 3/04883; H04N 5/23203; H04N 5/23206; H04N 5/23216; H04N 5/247; H04N 7/142; H04N 7/152
USPC .... 345/156, 161, 163–166; 178/18.01–19.07
See application file for complete search history.

(56) References Cited

U.S. PATENT DOCUMENTS

| 5,719,622 | A * | 2/1998 | Conway ................. H04N 7/185 340/531 |
| 6,891,527 | B1 * | 5/2005 | Chapman et al. ............ 345/158 |
| 8,089,520 | B2 * | 1/2012 | Ko et al. ...................... 348/211.1 |
| 8,199,107 | B2 * | 6/2012 | Xu et al. ........................ 345/158 |
| 8,656,440 | B2 * | 2/2014 | Chu .............................. 725/109 |
| 8,842,188 | B2 * | 9/2014 | Ezoe et al. ................. 348/211.8 |
| 8,964,052 | B1 * | 2/2015 | Wooley .................. H04N 5/232 348/14.03 |
| 2010/0045667 | A1* | 2/2010 | Kornmann ............ G06F 1/1626 345/419 |
| 2011/0085016 | A1* | 4/2011 | Kristiansen et al. ...... 348/14.03 |
| 2013/0069931 | A1* | 3/2013 | Wilson et al. ................ 345/419 |

FOREIGN PATENT DOCUMENTS

| CN | 101213509 A | 7/2008 |
| CN | 101513350 A | 8/2009 |
| CN | 101587423 A | 11/2009 |
| CN | 101673179 A | 3/2010 |
| JP | 2002-082768 A | 3/2002 |

* cited by examiner

*Primary Examiner* — Nelson Rosario
(74) *Attorney, Agent, or Firm* — Wolf, Greenfield & Sacks, P.C.

(57) ABSTRACT

Provided is a display control device including a communication unit that performs communication with an external device, a detecting unit that detects a direction of an operation device based on detection information representing motion of the operation device, and a display control unit that generates an imaging control command used to control an imaging operation based on the detected direction of the operation device, and controls display of an image obtained through an imaging operation by causing the communication unit to transmit the imaging control command to the external device.

15 Claims, 8 Drawing Sheets

DISPLAY CONTROL DEVICE

BACKGROUND

The present disclosure relates to a display control device.

In recent years, devices including an acceleration sensor, an angular velocity sensor, or the like have been spread, and a user can give various instructions to the device or an external device, for example, by performing an operation of moving the device including the sensor.

Further, for example, techniques using devices including an acceleration sensor, an angular velocity sensor, or the like have been developed. For example, Japanese Patent Application Laid-Open No. 2002-82768 discloses a technique of controlling a screen display based on a user's operation on a spherical operation device including an acceleration sensor and an angular velocity sensor.

SUMMARY

The present disclosure is made in light of the foregoing, and it is desirable to provide a display control device which is novel and improved and is capable of controlling an imaging operation in an external device based on motion of an operation device and controlling display of an image obtained through the imaging operation.

According to an embodiment of the present disclosure, there is provided a display control device, including a communication unit that performs communication with an external device, a detecting unit that detects a direction of an operation device based on detection information representing motion of the operation device, and a display control unit that generates an imaging control command used to control an imaging operation based on the detected direction of the operation device, and controls display of an image obtained through an imaging operation by causing the communication unit to transmit the imaging control command to the external device.

According to the embodiments of the present disclosure, it is possible to control an imaging operation in an external device based on motion of an operation device and control display of an image obtained through the imaging operation.

DETAILED DESCRIPTION OF THE EMBODIMENT(S)

Figure 1:
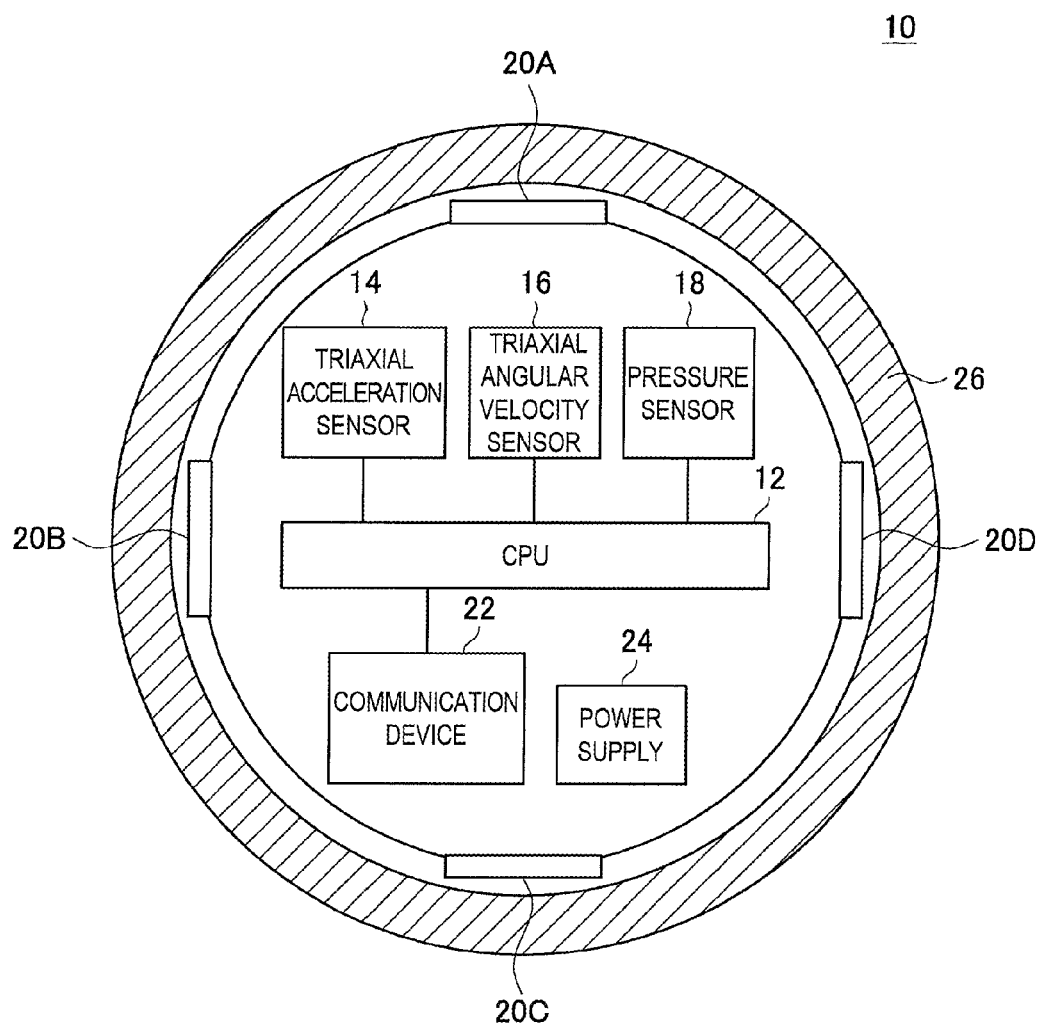
FIG. 1 is an explanatory view illustrating an example of a configuration of an operation device according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In the following, the description will proceed in following order.

1. Display Control Method According to Present Embodiment
2. Display Control Device According to Present Embodiment
3. Program According to Present Embodiment

Display Control Method According to Present Embodiment

Before describing a display control device according to the present embodiment, a display control method according to the present embodiment will be described. The following description will be made under the assumption that the display control device according to the present embodiment performs the display control method according to the present embodiment.

Outline of Display Control Method According to Present Embodiment

With the spread of networks such as the Internet and the development of communication technology, for example, it is possible to control an imaging operation of an imaging device connected via a network. As an imaging operation of an imaging device connected via a network can be controlled, for example, an imaging operation of an imaging device at a remote site can be controlled, and an image imaged by the imaging device can be displayed on a display screen at a remote site.

In addition, as a display technique is improved, for example, one or more images (still images/moving images) can be drawn in a virtual space, and an imaging operation of a virtual imaging device in the virtual space can be controlled. As the imaging operation of the virtual imaging device in the virtual space can be controlled, for example, a display that makes the user feel as if he/she is present in the virtual space can be implemented.

Here, control of an imaging operation in the existing imaging device or control of an imaging operation in the virtual imaging device is commonly performed based on the user's operation (for example, a click operation) on an operation device such as a mouse, a keyboard, or a button provided on a device.

However, when an image by an imaging operation is displayed on a display screen using an operation device such as a mouse, a keyboard, or a button provided on a device, for example, the user is likely to perform an operation while viewing an operation screen used to perform an operation. Thus, when the user causes an image obtained through an imaging operation to be displayed on a display screen using an operation device such as a mouse, a keyboard, or a button provided on a device, the user cannot necessarily cause a desired image obtained through an imaging operation to be displayed on a display screen by an intuitive operation.

In this regard, the display control device according to the present embodiment controls an imaging operation in an external device based on motion of an operation device and controls display of an image obtained through the imaging operation. More specifically, the display control device according to the present embodiment controls display of an image obtained through an imaging operation, for example, through a process (detecting process) of (1) and a process (display control process) of (2) described below.

(1) Detecting Process

The display control device according to the present embodiment detects motion of an operation device based on detection information representing motion of the operation device.

Here, examples of motion of the operation device detected by the display control device according to the present embodiment include the following (a) to (e):

(a) a direction of an operation device
(b) a direction of an operation device and an amount of change in direction of the operation device
(c) a direction of an operation device and an amount of change in position of the operation device
(d) a direction of an operation device, an amount of change in direction of the operation device, and an amount of change in position of the operation device
(e) any one of (a) to (d), and a pressure value changing according to a user's operation A device that includes various kinds of sensors capable of detecting motion of an operation device such as an acceleration sensor, an angular velocity sensor, or a magnetic sensor and allows the user to perform an intuitive operation may be used as an operation device according to the present embodiment.

FIG. 1 is an explanatory view illustrating a configuration of an operation device 10 according to the present embodiment and illustrates an example of an operation device held and used by the user.

For example, the operation device 10 includes a central processing unit (CPU) 12, a triaxial acceleration sensor 14, a triaxial angular velocity sensor 16, a pressure sensor 18, tact switches 20A to 20D, a communication device 22, and a power supply 24. A protective layer 26 is disposed on an external side of the operation device 10 and made of sponge, silicon, or the like. The operation device 10 may include another sensor such as a direction sensor.

For example, when the operation device 10 having the configuration illustrated in FIG. 1 is used, for example, the user performs an operation of rotating the operation device 10, an operation of moving the operation device 10, and an operation of changing a degree to which the operation device 10 is held (an operation of changing pressure with which the operation device 10 is held). Then, the display control device according to the present embodiment detects motion of the operation device 10 using data representing values of various sensors of the operation device 10 as detection information, and performs the process (the display control process) of (2) which will be described later.

Thus, the user can cause a desired image obtained through an imaging operation to be displayed on a display screen by performing a more intuitive operation, for example, using the operation device 10 having the configuration illustrated in FIG. 1. Of course, the operation device according to the present embodiment is not limited to a spherical (or almost spherical) device illustrated in FIG. 1.

For example, the display control device according to the present embodiment itself (that is, an own device) or an external device (that is, an external operation device) of the display control device according to the present embodiment may be used as the operation device according to the present embodiment.

Here, when the display control device according to the present embodiment itself is used as the operation device, the display control device according to the present embodiment includes various kinds of sensors such as an acceleration sensor, an angular velocity sensor, a pressure sensor, and a global positioning system (GPS) device, and detects motion of the operation device (that is, the display control device) based on data (an example of detection information) representing detection values of the various kinds of sensors. The display control device according to the present embodiment may further detect an operation amount in a physical operation on the operation device, for example, as described in the above (b) to (d).

On the other hand, when the external operation device is used as the operation device, the display control device according to the present embodiment performs wired/wireless communication with the external operation device, and receives detection information transmitted from the external operation device. Here, the detection information transmitted from external operation device may include detection values of various kinds of sensors installed in the external operation device such as an acceleration sensor, an angular velocity sensor, and a pressure sensor. Then, the display control device according to the present embodiment detects motion of the external operation device using the received detection information, and performs the process (the display control process) of (2) which will be described later.

The display control device according to the present embodiment detects motion of the operation device (the own device or the external operation device), for example, based on detection information corresponding to detection values of various kinds of sensors installed in the own device (operation device) or detection information corresponding to detection values of various kinds of sensors installed in the external operation device, which is received from the external operation device. A concrete configuration of the process (the detecting process) of (1) in the display control device according to the present embodiment will be described later.

(2) Display Control Process

The display control device according to the present embodiment controls an operation causing an image obtained through an imaging operation to be displayed on a display screen based on motion of the operation device detected in the process (the detecting process) of (1).

More specifically, the display control device according to the present embodiment generates an imaging control command used to control an imaging operation based on motion of the operation device detected in the process (the detecting process) of (1). Then, the display control device according to the present embodiment controls display of an image obtained through an imaging operation by transmitting the generated imaging control command to an external device connected via a network (or directly) in a wired manner or a wireless manner and causing the external device to execute the imaging control command.

Here, the display control device according to the present embodiment generates an imaging control command corresponding to the detected motion of the operation device. For example, an imaging control command used to control an imaging operation in a (real) imaging device or an imaging control command used to control an imaging operation in a virtual imaging device may be used as the imaging control command according to the present embodiment.

For example, the display control device according to the present embodiment specifies processing related to imaging control corresponding to the detected motion of the operation device based on a table in which the detection result of the motion of the operation device is associated with processing related to imaging control. Then, for example, the display control device according to the present embodiment generates an imaging control command including content (for example, processing code) of processing related to the specified imaging control or an ID uniquely representing processing related to imaging control. The imaging control command according to the present embodiment may include data representing a control amount of an imaging operation. For example, the display control device according to the present embodiment specifies the control amount of an imaging operation based on the detection information. Of course, a method of generating the imaging control command in the display control device according to the present embodiment is not limited to the above-described example.

Examples of a network according to the present embodiment include a wired network such as a local area network (LAN) or a wide area network (WAN), a wireless network such as a wireless local area network (WLAN), a wireless personal area network (WPAN), and a wireless wide area network (WWAN) using a base station, and the Internet using a communication protocol such as a transmission control protocol/Internet protocol (TCP/IP).

Examples of a display screen displaying an image obtained through an imaging operation according to the present embodiment include a display screen of a display unit (which will be described later) disposed in the display control device according to the present embodiment and a display screen of an external display device (for example, an external display device, an external information processing device of a personal computer (PC), or the like) of the display control device according to the present embodiment.

An example of the display control process in the display control device according to the present embodiment will be described below.

Figure 2:
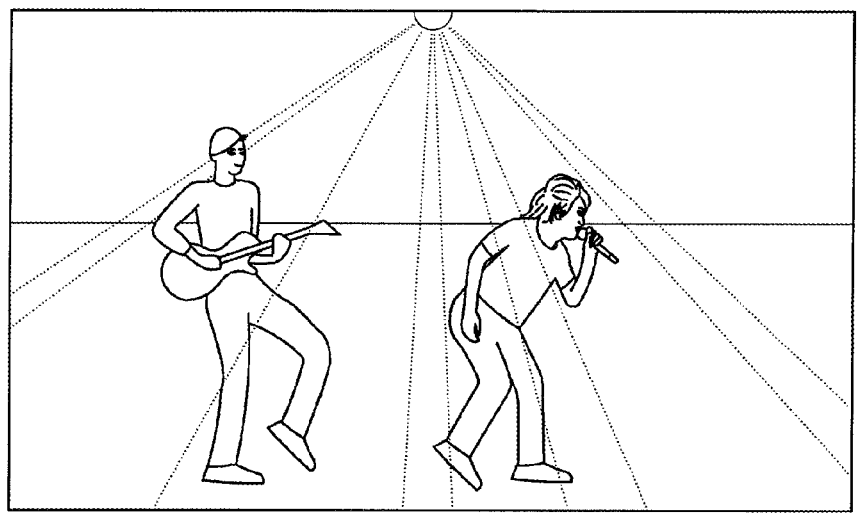
FIG. 2 is an explanatory view for describing an example of a display control process in a display control device according to the present embodiment.

(2-1) Example of Display Control Process Based on Imaging Control Command to Control Imaging Operation in (Real) Imaging Device FIG. 2 is an explanatory view for describing an example of the display control process in the display control device according to the present embodiment. Here, FIG. 2 illustrates an example of an image displayed on a display screen when the display control device according to the present embodiment generates an imaging control command used to control an imaging operation in a (real) imaging device.

The display control device according to the present embodiment generates the imaging control command based on the motion of the operation device detected in the process (the detecting process) of (1), and transmits the imaging control command to an imaging device installed in a concert hall. The imaging device that has received the imaging control command (directly or indirectly through another device) performs, for example, an imaging direction change, a zoom change, and position movement in response to the imaging control command.

Thus, for example, the user controls an imaging operation in the imaging device (the display control device according to the present embodiment) by performing a physical operation on the operation device such as an operation of moving the operation device backward and forward or an operation of changing the direction of the operation device, and thus can change an image (an image obtained through an imaging operation) to be displayed on the display screen.

Here, the display control device according to the present embodiment generates an imaging control command corresponding to the detected motion of the operation device, that is, an imaging control command corresponding to the user's operation on the operation device. For example, the user changes the direction of the operation device 45° to the left (rotates the operating device 45°), the display control device according to the present embodiment generates an imaging control command used to change the imaging direction of the imaging device 45° to the left. For example, when the user moves the operation device forward, the display control device according to the present embodiment generates an imaging control command used to move the imaging device forward. For example, as the display control device according to the present embodiment generates the imaging control command corresponding to the user's operation on the operation device as described above, the user can change an image (an image obtained through an imaging operation) to be displayed on the display screen through a more intuitive operation.

For example, when the user desires to continuously change an image (an image obtained through an imaging operation) to be displayed on the display screen, it is difficult for the user to continuously keep moving the operation device. The display control device according to the present embodiment may perform, for example, threshold processing using the detection information. Thus, even when the user does not continuously keep moving the operation device, an image (an image obtained through an imaging operation) to be displayed on the display screen can be continuously changed.

More specifically, for example, when the user changes the direction of the operation device, the display control device according to the present embodiment detects an amount of change in direction of the operation device based on the detection information, and compares the detected amount of change in direction with a threshold value (for example, 45°) corresponding to the amount of change in direction. Then, when the detected amount of change in direction is greater than the threshold value (or greater than or equal to the threshold value), the display control device according to the present embodiment keeps transmitting the imaging control command corresponding to an operation performed by the user to the imaging device, for example, until a predetermined stop operation such as an operation of reversing the direction of the operation device is performed on the operation device, until it becomes difficult to perform processing corresponding to the imaging control command in the imaging device, or until a stop button is pressed.

Here, the display control device according to the present embodiment performs appropriate communication with, for example, the imaging device and then determines whether or not the imaging device can perform processing corresponding to the imaging control command. More specifically, for example, when data representing that it is difficult to change the imaging direction to a direction represented by the imaging control command or that it is difficult to change the imaging direction to a moving direction represented by the imaging control command is received from the imaging device, the display control device according to the present embodiment determines that it is difficult for the imaging device to perform processing corresponding to the imaging control command.

For example, when the user has moved the operation device forward, the display control device according to the present embodiment detects an amount of change in position of the operation device based on the detection information, and compares the detected amount of change in position with a threshold value (for example, 20 cm) corresponding to the amount of change in position. Here, when the detected amount of change in position is greater than the threshold value (or greater than or equal to the threshold value), the display control device according to the present embodiment keeps transmitting the imaging control command corresponding to an operation performed by the user to the imaging device, for example, until a predetermined stop operation is performed on the operation device, until it becomes difficult to perform processing corresponding to the imaging control command in the imaging device, or until a stop button is pressed.

For example, as the display control device according to the present embodiment performs threshold processing using the detection information as described above, even when the user does not continuously keep moving the operation device, an image (an image obtained through an imaging operation) to be displayed on the display screen can be continuously changed. Thus, for example, as the display control device according to the present embodiment performs threshold processing using the detection information as described above, the display control device according to the present embodiment can further improve operability for the user.

Further, various threshold values used for threshold processing by the display control device according to the present embodiment may be previously specified fixed values or may be values changeable by the user.

For example, the display control device according to the present embodiment controls an imaging operation in a (real) imaging device through the imaging control command as described above and thus controls an operation of causing an image obtained through an imaging operation to be displayed on the display screen.

An example of controlling an imaging operation in a (real) imaging device through the imaging control command is not limited to the example described with reference to FIG. 2. For example, the display control device according to the present embodiment may further detect a pressure value that changes according to the user's operation based on the detection information and then control an imaging operation in a (real) imaging device based on a result of threshold processing using the detected pressure value and a threshold value corresponding to the pressure value.

Here, as control based on the result of threshold processing using the detected pressure value and a threshold value corresponding to the pressure value, for example, the imaging control command may be selectively generated based on the result of threshold processing using the detected pressure value and a threshold value corresponding to the pressure value.

More specifically, when the detected pressure value is greater than the threshold value (or greater than or equal to the threshold value), the display control device according to the present embodiment validates, for example, an imaging control command generating process. In this case, by performing a physical operation in a state in which the operation device is held with a certain level of pressure, the user can control an imaging operation in the imaging device (through the display control device according to the present embodiment) and thus can change an image (an image obtained through an imaging operation) to be displayed on the display screen. However, when the detected pressure value is less than or equal to the threshold value (or less than the threshold value), the display control device according to the present embodiment invalidates, for example, the imaging control command generating process. In this case, even though the user has performed a physical operation and thus the detection information has been acquired, the display control device according to the present embodiment does not generate the imaging control command.

For example, when the display control device according to the present embodiment selectively generates the imaging control command based on the result of threshold processing using the detected pressure value and the threshold value corresponding to the pressure value as described above, the user's operation of changing a degree to which the operation device is held corresponds to a start and an end of a change of an image obtained through an imaging operation.

In the display control device according to the present embodiment, the process of selectively generating the imaging control command based on the result of threshold processing using the detected pressure value and the threshold value corresponding to the pressure value is not limited to the above-described example. For example, the display control device according to the present embodiment may alternately validate and invalidate the imaging control command generating process each time the detected pressure value is greater than the threshold value (or the detected pressure value is greater than or equal to the threshold value).

Further, in the display control device according to the present embodiment, the control based on the result of threshold processing using the detected pressure value and a threshold value corresponding to the pressure value is not limited to the above example of selectively generating the imaging control command. For example, when the detected pressure value is greater than the threshold value (or the detected pressure value is greater than or equal to the threshold value), the imaging control command corresponding to the user's operation of holding the operation device such as the imaging control command to cause the imaging device to perform a zooming operation may be generated.

(2-2) Example of Display Control Process Based on Imaging Control Command to Control Imaging Operation in Virtual Imaging Device FIGS. 3 to 7 are explanatory views for describing examples of the display control process in the display control device according to the present embodiment. Here, FIGS. 3 to 7 illustrate examples of images displayed on the display screen when the display control device according to the present embodiment generates an imaging control command used to control an imaging operation in a virtual imaging device.

The display control device according to the present embodiment generates an imaging control command based on motion of the operation device detected in the process (the detecting process) of (1), and then transmits the generated imaging control command to an external device such as an information processing device including a PC or the like, a display device including a television receiver, or the like. The external device that has received the imaging control command (directly or indirectly through another device) performs, for example, an imaging direction change, a zoom change, and position movement in a virtual space of a virtual imaging device in the virtual imaging device in the virtual space in response to the imaging control command.

A. Example Illustrated in FIG. 3

Figure 3:
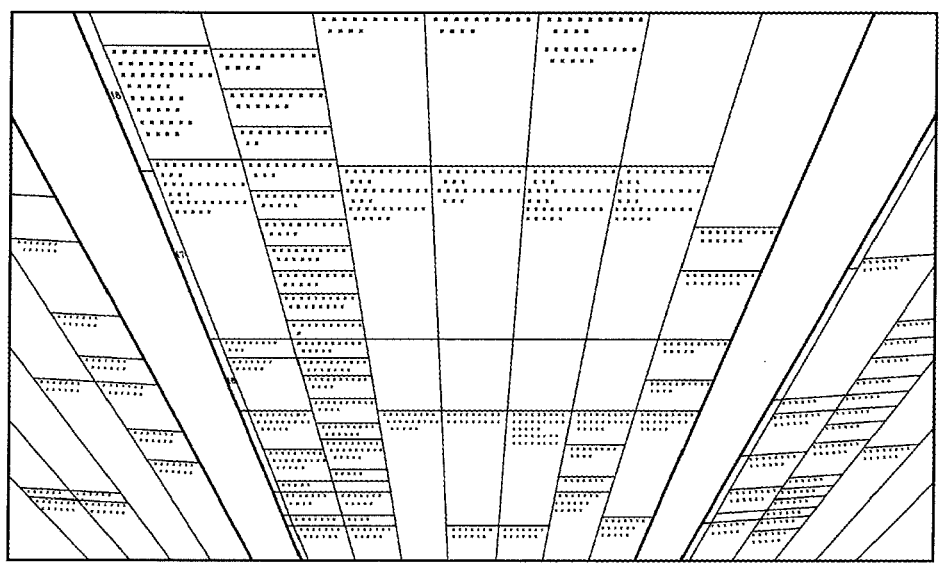
FIG. 3 is an explanatory view for describing an example of a display control process in a display control device according to the present embodiment.

FIG. 3 illustrates an example of an image in which a television broadcast program table is drawn in a virtual space. Here, in the television broadcast program table illustrated in FIG. 3, program tables of respective dates are displayed side by side in a horizontal direction. A vertical direction represents a time axis, and a horizontal direction represents a channel. As the user performs a physical operation on the operation device, for example, performs an operation of changing the direction of the operation device, the display control device according to the present embodiment generates an imaging control command corresponding to the user's operation on the operation device, and then transmits the imaging control command to the external device. Thus, by performing a physical operation on the operation device, the user can control an imaging operation in the virtual imaging device (through the display control device according to the present embodiment) and change an image (an image obtained through an imaging operation) to be displayed on the display screen.

More specifically, for example, when the user changes the direction of the operation device to the vertical direction, the display control device according to the present embodiment generates an imaging control command used to change the imaging direction of the imaging device, and transmits the generated imaging control command to the external device. As a result, an image in which the position observed in the television broadcast program table has been changed in the time axis direction is displayed on the display screen.

Further, for example, when the user changes the direction of the operation device to the horizontal direction, the display control device according to the present embodiment generates an imaging control command used to change the imaging direction of the imaging device to the horizontal direction, and then transmits the generated imaging control command to the external device.

Here, the display control device according to the present embodiment may change content of the imaging control command, for example, based on the result of threshold processing using an amount of change in direction detected based on the detection information and a threshold value corresponding to the amount of change in direction. For example, when the detected amount of change in the detected direction is less than or equal to the threshold value (or less than the threshold value), the display control device according to the present embodiment generates an imaging control command used to move the position observed in the television broadcast program table in the horizontal direction. In this case, an image in which a channel has been changed is displayed on the display screen. Further, for example, when the detected amount of change in direction is greater than the threshold value (or greater than or equal to the threshold value), the display control device according to the present embodiment generates an imaging control command used to further move the position observed in the television broadcast program table in the horizontal direction. In this case, an image in which a date of the television broadcast program table has been changed is displayed on the display screen.

For example, as the display control device according to the present embodiment generates the imaging control command corresponding to the user's operation on the operation device as described above, the user can cause the television broadcast program table in which a desired program is viewed to be displayed on the display screen through a more intuitive operation.

Even in the example illustrated in FIG. 3, similarly to the example illustrated in FIG. 2, the display control device according to the present embodiment may continuously change an image (an image obtained through an imaging operation) to be displayed on the display screen by performing threshold processing using the detection information. In this case, the display control device according to the present embodiment keeps transmitting the imaging control command corresponding to an operation performed by the user to the external device, for example, until a predetermined stop operation such as an operation of reversing the direction of the operation device is performed on the operation device, until it becomes difficult to perform processing corresponding to the imaging control command in the external device, or until a stop button is pressed.

Here, the display control device according to the present embodiment performs appropriate communication with, for example, the external device and then determines whether or not the external device can perform processing corresponding to the imaging control command. More specifically, for example, when data representing that it is difficult to change the imaging direction of the virtual imaging device to a direction represented by the imaging control command is received from the external device, the display control device according to the present embodiment determines that it is difficult for the external device to perform processing corresponding to the imaging control command.

Since it is determined whether or not the external device can perform processing corresponding to the imaging control command as described above, the display control device according to the present embodiment can stop generating the imaging control command, for example, when the position observed in the television broadcast program table is about to move to a time zone, a channel, and a date which are difficult to display.

B. Example Illustrated in FIG. 4

Figure 4:
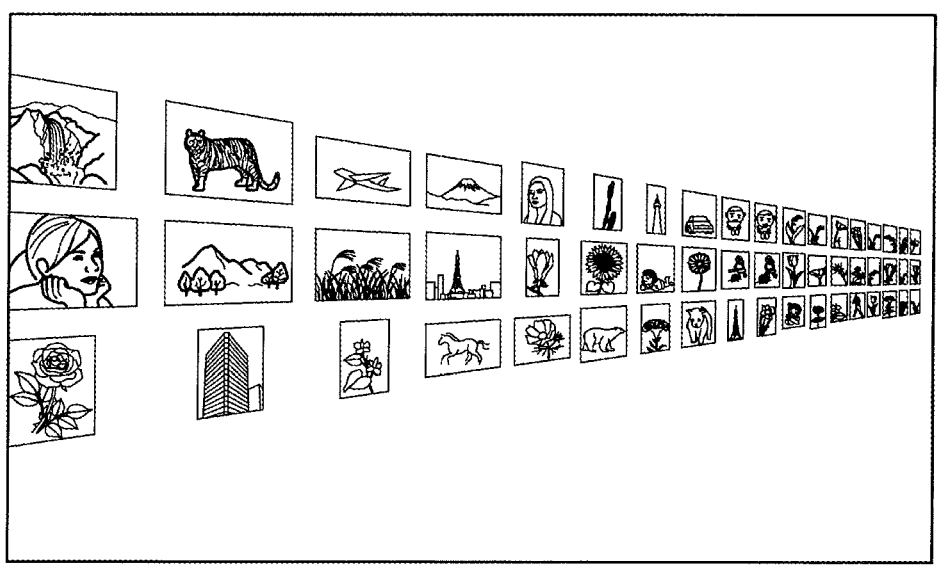
FIG. 4 is an explanatory view for describing an example of a display control process in a display control device according to the present embodiment.

FIG. 4 illustrates an example of an image in which a plurality of still images or moving images are drawn in a virtual space as in a gallery. As the user performs a physical operation on the operation device, for example, performs an operation of changing the direction of the operation device, the display control device according to the present embodiment generates an imaging control command corresponding to the user's operation on the operation device, and then transmits the imaging control command to the external device. Thus, by performing a physical operation on the operation device, the user can control an imaging operation in the virtual imaging device (through the display control device according to the present embodiment) and change an image (an image obtained through an imaging operation) to be displayed on the display screen.

More specifically, for example, when the user changes the direction of the operation device to the vertical direction, the display control device according to the present embodiment generates the imaging control command corresponding to the user's operation, and transmits the generated imaging control command to the external device.

Here, the display control device according to the present embodiment may change content of the imaging control command, for example, based on the result of threshold processing using an amount of change in direction detected based on the detection information and a threshold value corresponding to the amount of change in direction. For example, when the detected amount of change in the detected direction is less than or equal to the threshold value (or less than the threshold value), the display control device according to the present embodiment generates an imaging control command used to make an inclination by an angle corresponding to an amount of change in direction. In this case, an image inclined by an angle corresponding to an amount of change in direction is displayed on the display screen, and the user can view many images arranged in the left direction. Further, for example, when the detected amount of change in direction is greater than the threshold value (or greater than or equal to the threshold value), the display control device according to the present embodiment generates an imaging control command used to scroll in the horizontal direction in a state in which an inclination is made at an angle corresponding to a threshold value. In this case, an image scrolled in the horizontal direction in a state in which an inclination is made at the angle corresponding to the threshold value is displayed on the display screen.

For example, as the display control device according to the present embodiment generates the imaging control command corresponding to the user's operation on the operation device as described above, the user can control an imaging operation in the imaging device that performs an imaging operation in the virtual space illustrated in FIG. 4 and change an image (an image obtained through an imaging operation) to be displayed on the display screen through a more intuitive operation.

Even in the example illustrated in FIG. 4, similarly to the example illustrated in FIG. 2, the display control device according to the present embodiment may continuously change an image (an image obtained through an imaging operation) to be displayed on the display screen by performing threshold processing using the detection information. In this case, the display control device according to the present embodiment keeps transmitting the imaging control command corresponding to an operation performed by the user to the external device, for example, until a predetermined stop operation such as an operation of reversing the direction of the operation device is performed on the operation device, until it becomes difficult to perform processing corresponding to the imaging control command in the external device, or until a stop button is pressed.

Here, the display control device according to the present embodiment performs appropriate communication with, for example, the external device and then determines whether or not the external device can perform processing corresponding to the imaging control command. More specifically, similarly to the example illustrated in FIG. 3, for example, when data representing that it is difficult to change the imaging direction of the virtual imaging device to a direction represented by the imaging control command, the display control device according to the present embodiment determines that it is difficult for the external device to perform processing corresponding to the imaging control command.

Since it is determined whether or not the external device can perform processing corresponding to the imaging control command as described above, the display control device according to the present embodiment can stop generating the imaging control command, for example, when a scroll operation is about to be performed in a space, in which an image is not present, in the virtual space.

C. Examples Illustrated in FIGS. 5 and 6

Figure 5:
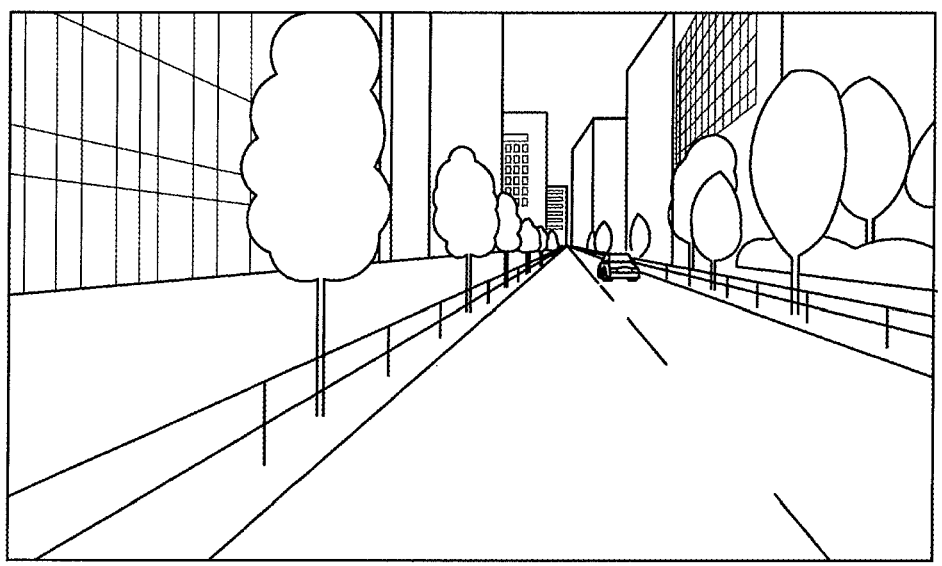
FIG. 5 is an explanatory view for describing an example of a display control process in a display control device according to the present embodiment.
Figure 6:
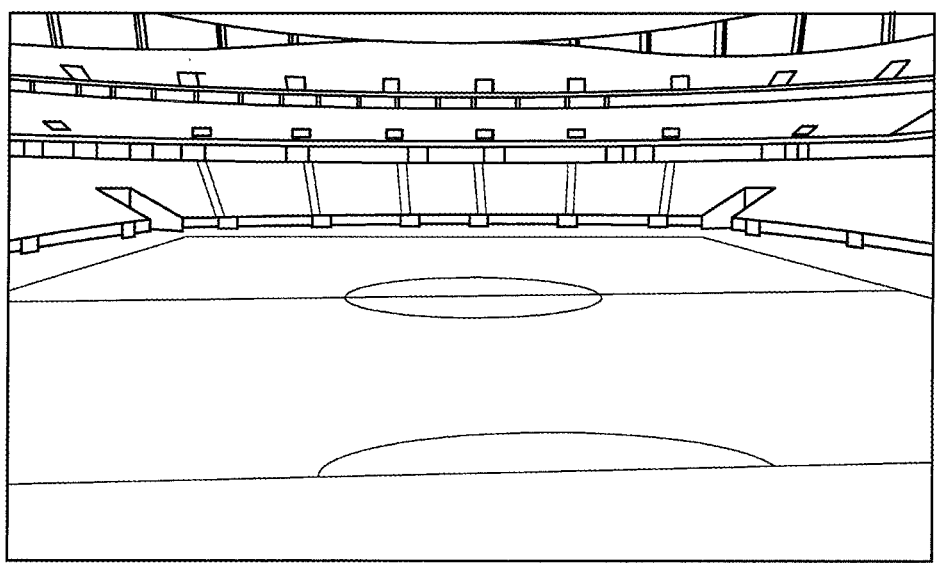
FIG. 6 is an explanatory view for describing an example of a display control process in a display control device according to the present embodiment.

FIGS. 5 and 6 illustrate examples of an image displayed in a virtual space configured with an image imaged in the past. As the user performs a physical operation on the operation device, for example, performs an operation of changing the direction of the operation device and moving the operation device forward, the display control device according to the present embodiment generates the imaging control command corresponding to the user's operation on the operation device, and transmits the imaging control command to the external device. Thus, by performing a physical operation on the operation device, the user can control an imaging operation in the virtual imaging device (through the display control device according to the present embodiment) and change an image (an image obtained through an imaging operation) to be displayed on the display screen.

More specifically, for example, when the user has changed the direction of the operation device 45° to the left, the display control device according to the present embodiment generates the imaging control command used to change the imaging direction of the imaging device 45° to the left, and transmits the generated imaging control command to the external device. In this case, an image in which a point of view in a virtual space configured with an image imaged in the past has been moved 45° to the right is displayed on the display screen. Further, for example, when it is possible to move a point of view in the vertical direction as in the example illustrated in FIG. 6, the display control device according to the present embodiment can cause an image in which a point of view in a virtual space configured with an image imaged in the past has been moved in the vertical direction to be displayed on the display screen, for example, based on a change of the direction of the operation device in the vertical direction.

Further, when the user has moved the operation device forward, the display control device according to the present embodiment generates the imaging control command used to move the imaging device forward, and transmits the generated imaging control command to the external device. In this case, an image in which a point of view in a virtual space configured with an image imaged in the past has been moved forward is displayed on the display screen. Further, for example, when movement in the vertical direction is possible as in the example illustrated in FIG. 6, the display control device according to the present embodiment can cause an image in which the position in the virtual space configured with an image imaged in the past has been moved in the vertical direction, for example, based on movement of the operation device in the vertical direction to be displayed on the display screen.

For example, as the display control device according to the present embodiment generates the imaging control command corresponding to the user's operation on the operation device as described above, the user can control an imaging operation in an imaging device that images the virtual space configured with an image imaged in the past, which is illustrated in FIGS. 5 and 6 and change an image (an image obtained through an imaging operation) to be displayed on the display screen through a more intuitive operation.

In the examples illustrated in FIGS. 5 and 6, similarly to the example illustrated in FIG. 2, the display control device according to the present embodiment may continuously change an image (an image obtained through an imaging operation) to be displayed on the display screen by performing threshold processing using the detection information. In this case, the display control device according to the present embodiment keeps transmitting the imaging control command corresponding to an operation performed by the user to the external device, for example, until a predetermined stop operation such as an operation of reversing the direction of the operation device is performed on the operation device, until it becomes difficult to perform processing corresponding to the imaging control command in the external device, or until a stop button is pressed.

Here, the display control device according to the present embodiment performs appropriate communication with, for example, the external device and then determines whether or not the external device can perform processing corresponding to the imaging control command. More specifically, for example, when data representing that it is difficult to move the virtual imaging device in the moving direction of the horizontal direction represented by the imaging control command (the examples illustrated in FIGS. 5 and 6) or that it is difficult to move the virtual imaging device in the moving direction of the vertical direction represented by the imaging control command (the example illustrated in FIG. 6) is received from the external device, the display control device according to the present embodiment determines that it is difficult for the external device to perform processing corresponding to the imaging control command.

Since it is determined whether or not the external device can perform processing corresponding to the imaging control command as described above, the display control device according to the present embodiment can stop generating the imaging control command, for example, when it is about to move to the position to which it is difficult to move in the virtual space configured with an image imaged in the past.

D. Example Illustrated in FIG. 7

Figure 7:
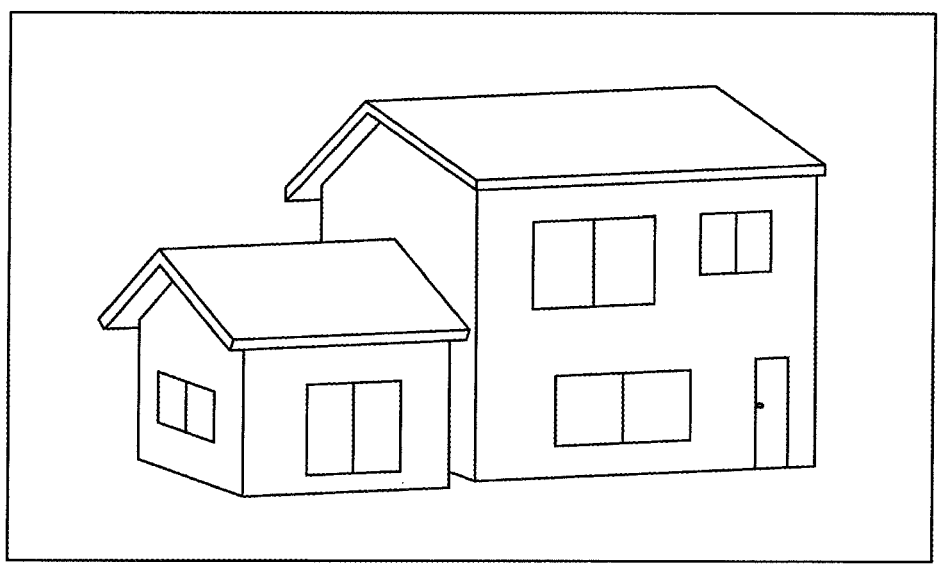
FIG. 7 is an explanatory view for describing an example of a display control process in a display control device according to the present embodiment.

FIG. 7 illustrates an example of an image in which a three-dimensional (3D) model of a house is drawn in a virtual space. Here, the 3D model of the house illustrated in FIG. 7 is assumed to include a 3D model showing an inside of the house as well as a 3D model showing an external appearance of the house illustrated in FIG. 7. As the user performs a physical operation on the operation device, for example, performs an operation of changing the direction of the operation device and moving the operation device forward, the display control device according to the present embodiment generates the imaging control command corresponding to the user's operation on the operation device, and transmits the imaging control command to the external device. Thus, by performing a physical operation on the operation device, the user can control an imaging operation in the virtual imaging device (through the display control device according to the present embodiment) and change an image (an image obtained through an imaging operation) to be displayed on the display screen.

More specifically, for example, when the user changes the direction of the operation device 45° to the left in a state in which the 3D model showing the external appearance of the house is displayed, the display control device according to the present embodiment generates an imaging control command used to display an image in which the direction of the house has been changed 45° to the left (an image in which the house has been rotated 45° to the left), and transmits the generated imaging control command to the external device. In this case, the image in which the house has been rotated 45° to the left is displayed on the display screen.

Further, for example, when the user moves the operation device forward in a state in which the 3D model showing the external appearance of the house is displayed, the display control device according to the present embodiment generates an imaging control command used to display an image in which the house is more distantly displayed, and transmits the generated imaging control command to the external device. On the other hand, for example, when the user moves the operation device backward in a state in which the 3D model showing the external appearance of the house is displayed, the display control device according to the present embodiment generates an imaging control command used to display an image in which the house is more closely displayed, and transmits the generated imaging control command to the external device. In this case, the image in which the house is more distantly or more closely displayed is displayed on the display screen.

Further, for example, when the user changes the direction of the operation device 45° to the left in a state in which the 3D model showing the inside of the house is displayed, the display control device according to the present embodiment generates an imaging control command used to change the imaging direction of the imaging device 45° to the left, and transmits the generated imaging control command to the external device. In this case, an image in which a point of view in the inside of the house has been moved 45° to the right is displayed on the display screen.

Further, for example, when the user moves the operation device forward in a state in which the 3D model showing the inside of the house is displayed, the display control device according to the present embodiment generates an imaging control command used to move a point of view in the inside of the house (virtual space) forward, and transmits the generated imaging control command to the external device. On the other hand, for example, when the user moves the operation device backward in a state in which the 3D model showing the inside of the house is displayed, the display control device according to the present embodiment generates an imaging control command used to move a point of view in the inside of the house (virtual space) backward, and transmits the generated imaging control command to the external device. In this case, the image in which the point of view in the inside of the house has been moved forward or the image in which the point of view in the inside of the house has been moved backward is displayed on the display screen.

For example, as the display control device according to the present embodiment generates the imaging control command corresponding to the user's operation on the operation device as described above, the user can control an imaging operation in an imaging device that images the virtual space and change an image (an image obtained through an imaging operation) to be displayed on the display screen through a more intuitive operation.

In the example illustrated in FIG. 7, similarly to the example illustrated in FIG. 2, the display control device according to the present embodiment may continuously change an image (an image obtained through an imaging operation) to be displayed on the display screen by performing threshold processing using the detection information. In this case, the display control device according to the present embodiment keeps transmitting the imaging control command corresponding to an operation performed by the user to the external device, for example, until a predetermined stop operation such as an operation of reversing the direction of the operation device is performed on the operation device, until it becomes difficult to perform processing corresponding to the imaging control command in the external device, or until a stop button is pressed.

Here, the display control device according to the present embodiment performs appropriate communication with, for example, the external device and then determines whether or not the external device can perform processing corresponding to the imaging control command. More specifically, for example, when the imaging direction of the virtual imaging device is changed to the direction represented by the imaging control command, if data representing that a display target (for example, the house illustrated in FIG. 7) is not displayed (for example, when the 3D model showing the external appearance is displayed) or that it is difficult to move the virtual imaging device to the moving direction represented by the imaging control command (for example, when the 3D model showing the inside is displayed) is received from the external device, the display control device according to the present embodiment determines that it is difficult for the external device to perform processing corresponding to the imaging control command.

Since it is determined whether or not the external device can perform processing corresponding to the imaging control command as described above, the display control device according to the present embodiment can stop generating the imaging control command, for example, before it becomes difficult to display the display target on the display screen, or when it is about to move to the position to which it is difficult to move in the virtual space.

The display control device according to the present embodiment controls an operation of displaying an image obtained through an imaging operation on the display screen by controlling an imaging operation in the virtual imaging device through the imaging control command, for example, as in the examples illustrated in FIGS. 3 to 7.

The example of controlling an imaging operation in the virtual imaging device through the imaging control command is not limited to the examples described with reference to FIGS. 3 to 7. For example, similarly to when an imaging operation in a (real) imaging device is controlled through an imaging control command, the display control device according to the present embodiment may further detect a pressure value that changes according to the user's operation based on the detection information and control an imaging operation in the virtual imaging device based on the result of threshold processing using the detected pressure value and a threshold value corresponding to the pressure value.

The display control device according to the present embodiment controls an imaging operation in a (real) imaging device or an imaging operation in a virtual imaging device, and controls display of an image obtained through an imaging operation, for example, as in the examples illustrated in FIG. 2 or FIGS. 3 to 7.

The display control device according to the present embodiment controls an imaging operation in an external device based on motion of the operation device and controls display of an image obtained through an imaging operation, for example, through the process (the detecting process) of (1) and the process (the display control process) of (2).

Here, the display control device according to the present embodiment detects motion of the operation device from the detection information based on the user's physical operation on the operation device, transmits an imaging control command corresponding to the detected motion of the operation device to the external device, and controls display of an image obtained through an imaging operation. Thus, even when the user performs an operation without viewing an operation screen used to perform an operation, it is possible to control an imaging operation in an imaging device (through the display control device according to the present embodiment) and change an image (an image obtained through an imaging operation) to be displayed on the display screen. Further, the user can control an imaging operation in an imaging device (through the display control device according to the present embodiment) and cause a desired image obtained through an imaging operation to be displayed on the display screen through more intuitive operation.

Concrete Examples of Process Related to Display Control Method According to Present Embodiment Next, concrete examples of a process related to a display control method in the display control device according to the present embodiment will be described. In the following, the process related to the display control method according to the present embodiment will be described in connection with examples in which the operation device according to the present embodiment includes an acceleration sensor, an angular velocity sensor, and a magnetic sensor. Of course, the operation device according to the present embodiment may include another sensor capable of detecting motion of the operation device such as a pressure sensor or a GPS device.

1. First Example

Figure 8:
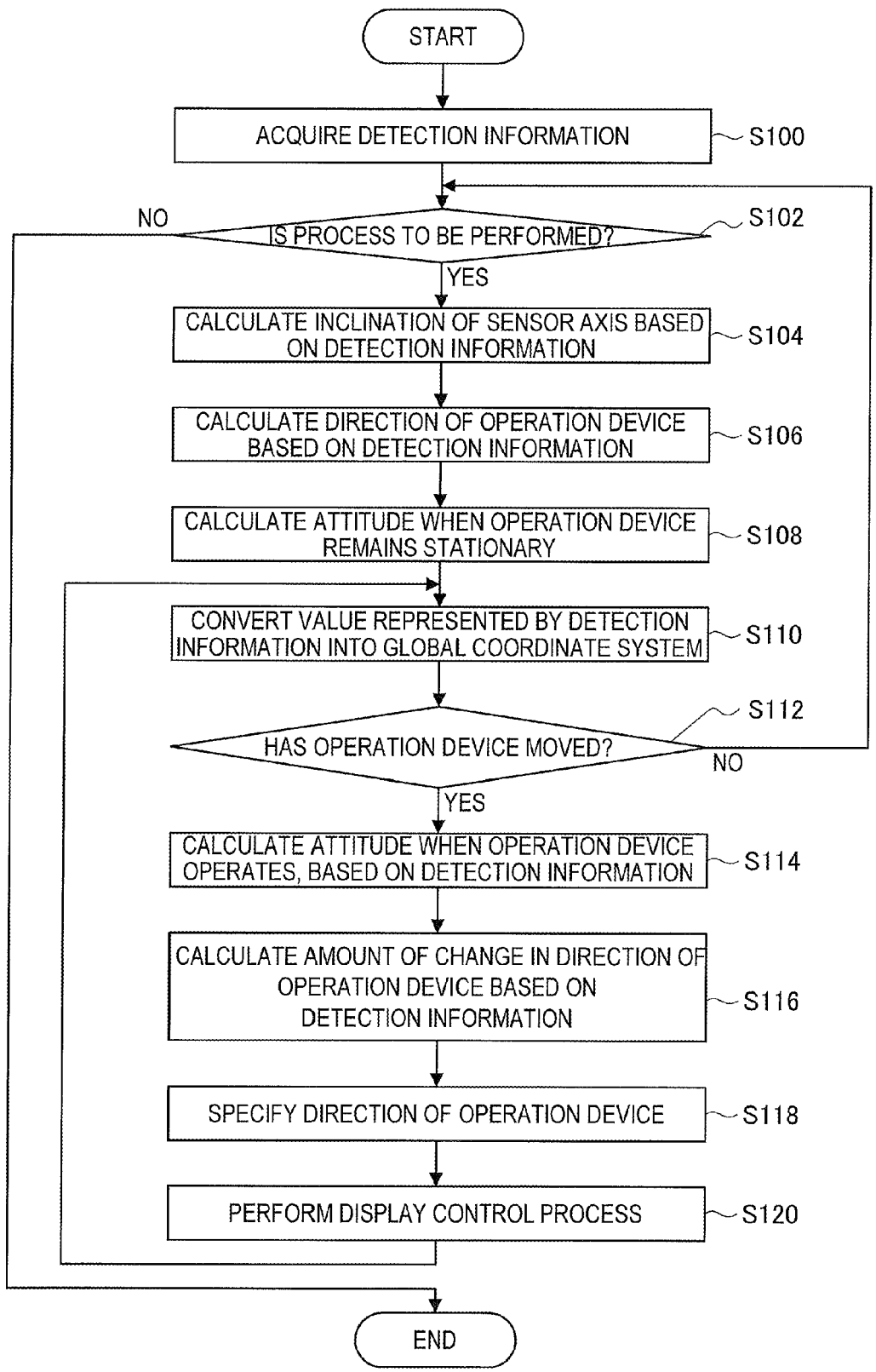
FIG. 8 is a flowchart illustrating a first example of a process related to a display control method in a display control device according to the present embodiment.

FIG. 8 is a flowchart illustrating a first example of the process related to the display control method in the display control device according to the present embodiment. Here, the processes of steps S100 to S118 illustrated in FIG. 8 correspond to the process (the detecting process) of (1), and the process of step S120 illustrated in FIG. 8 corresponds to the process (the display control process) of (2).

The display control device according to the present embodiment acquires detection information (S100). Here, the display control device according to the present embodiment acquires the detection information by receiving the detection information transmitted, for example, from the external operation device connected in a wired/wireless manner or acquires the detection information through various kinds of sensors that generate the detection information in response to the motion of the display control device according to the present embodiment, which are installed in the display control device according to the present embodiment. Further, for example, when the user does not perform a physical operation on the external operation device or the display control device according to the present embodiment, no detection information is acquired in step S100. Although not illustrated in FIG. 8, even while step S104 and subsequent steps (which will be described later) are being performed, the display control device according to the present embodiment can acquire the detection information.

The display control device according to the present embodiment determines whether or not the process related to the display control method according to the present embodiment is to be performed (S102). Here, when the detection information has been acquired in step S100, the display control device according to the present embodiment determines that the process is to be performed. However, when the detection information has not been acquired in step S100, the display control device according to the present embodiment determines that the process is not to be performed.

The process of step S102 in the display control device according to the present embodiment is not limited to the above example. For example, when the detection information includes a pressure value (for example, a detection value of a pressure sensor), the display control device according to the present embodiment may perform the determination of step S102 based on the result of threshold processing using the pressure value detected based on the detection information and a threshold value corresponding to the pressure value. More specifically, when the detected pressure value is greater than the threshold value (or greater than or equal to the threshold value), the display control device according to the present embodiment determines in step S102 that the process is to be performed. However, when the detected pressure value is less than or equal to the threshold value (or less than the threshold value), the display control device according to the present embodiment determines in step S102 that the process is not to be performed.

Here, when it is determined in step S102 that the process related to the display control method according to the present embodiment is not to be performed, the display control device according to the present embodiment ends the process related to the display control method according to the present embodiment. The process related to the display control method according to the present embodiment illustrated in FIG. 8 is not a process of a type that is not performed again after ending once but a process which is repeatedly performed.

However, when it is determined in step S102 that the process related to the display control method according to the present embodiment is to be performed, the display control device according to the present embodiment calculates an inclination of a sensor axis based on the detection information (S104). Here, the display control device according to the present embodiment calculates an inclination of a sensor axis using a value representing acceleration (for example, a detection value of the acceleration sensor) which is included in the detection information.

Then, the display control device according to the present embodiment calculates a direction of the operation device based on the detection information (S106). Here, the display control device according to the present embodiment calculates the direction of the operation device using a value representing magnetic strength (for example, a detection value of the magnetic sensor) which is included in the detection information.

FIG. 8 illustrates the example in which the process of step S106 is performed after the process of step S104 but the process related to the display control method according to the present embodiment is not limited to the above example. For example, the display control device according to the present embodiment can perform the process of step S104 and the process of step S106 independently of each other. Thus, the display control device according to the present embodiment may perform the process of step S104 after the process of step S106 or may perform the process of step S104 and the process of step S106 at the same time.

Here, when the processes of steps S104 and S106 are completed, the display control device according to the present embodiment calculates an attitude when the operation device remains stationary (S108). The display control device according to the present embodiment calculates the frame matrix representing the attitude when the operation device remains stationary, for example, based on the inclination of the sensor axis calculated in step S104 and the direction of the operation device calculated in step S106.

Here when the frame matrix representing the attitude when the operation device remains stationary is calculated in step S108, the display control device according to the present embodiment converts various values represented by the detection information acquired in step S100 to the global coordinate system (S110). Here, the display control device according to the present embodiment performs the process of step S110 because there are cases in which axes of various sensors (for example, an x axis, a y axis, and a z axis in the case of a triaxial sensor) have rotated.

Here, when the process of step S110 is completed, the display control device according to the present embodiment determines whether or not the operation device has moved (S112). Here, the display control device according to the present embodiment determines that the operation device has moved, for example, when there is a change in the various values represented by the detection information.

Here, when it is determined in step S112 that the operation device has not moved, the display control device according to the present embodiment repeats the process from step S102.

However, when it is determined in step S112 that the operation device has moved, the display control device according to the present embodiment calculates an attitude when the operation device operates, based on the detection information (S114). The display control device according to the present embodiment calculates the inclination of the sensor axis and the direction of the operation device, and calculates a frame matrix representing the attitude when the operation device operates based on the calculated inclination of the sensor axis and the direction of the operation device.

The display control device according to the present embodiment calculates an amount of change in direction of the operation device based on the detection information (S116). Here, the display control device according to the present embodiment calculates an amount of change in direction of the operation device by calculating an angle (more specifically, an angle in the global coordinate system), for example, using a value obtained by converting a value (for example, a detection value of the angular velocity sensor) representing the angular velocity included in the detection information into the global coordinate system.

FIG. 8 illustrates the example in which the process of step S116 is performed after the process of step S114, but the process related to the display control method according to the present embodiment is not limited to the above example. For example, the display control device according to the present embodiment can perform the process of step S114 and the process of step S116 independently of each other. Thus, the display control device according to the present embodiment may perform the process of step S114 after the process of step S116 or may perform the process of step S114 and the process of step S116 at the same time.

When the processes of step S114 and S116 are completed, the display control device according to the present embodiment specifies the direction of the operation device (S118). Here, the display control device according to the present embodiment specifies the direction of the operation device by calculating a rotation matrix of axial rotation of any of the x axis, the y axis, and the z axis, for example, based on the frame matrix calculated in step S114 and the angle in the global coordinate system calculated in step S116.

When the direction of the operation device is specified in step S118, the display control device according to the present embodiment performs the display control process based on the specified direction of the operation device (an example of motion of the operation device) (S120). Here, the display control device according to the present embodiment generates the imaging control command corresponding to the specified direction of the operation device, for example, using a table in which the motion of the operation device is associated with processing related to imaging control. Then, the display control device according to the present embodiment controls display of an image obtained through an imaging operation by transmitting the generated imaging control command to the external device connected via a network (or directly) in a wired/wireless manner and causing the external device to execute the imaging control command.

Then, the display control device according to the present embodiment repeats the process from step S110.

The display control device according to the present embodiment can implement the display control method according to the present embodiment (the process (the detecting process) of (1) and the process (the display control process) of (2)), for example, by performing the process illustrated in FIG. 8. Thus, for example, by performing the process illustrated in FIG. 8, the display control device according to the present embodiment can control an imaging operation in the external device based on motion of the operation device and control display of an image obtained through an imaging operation.

2. Second Example

Figure 9:
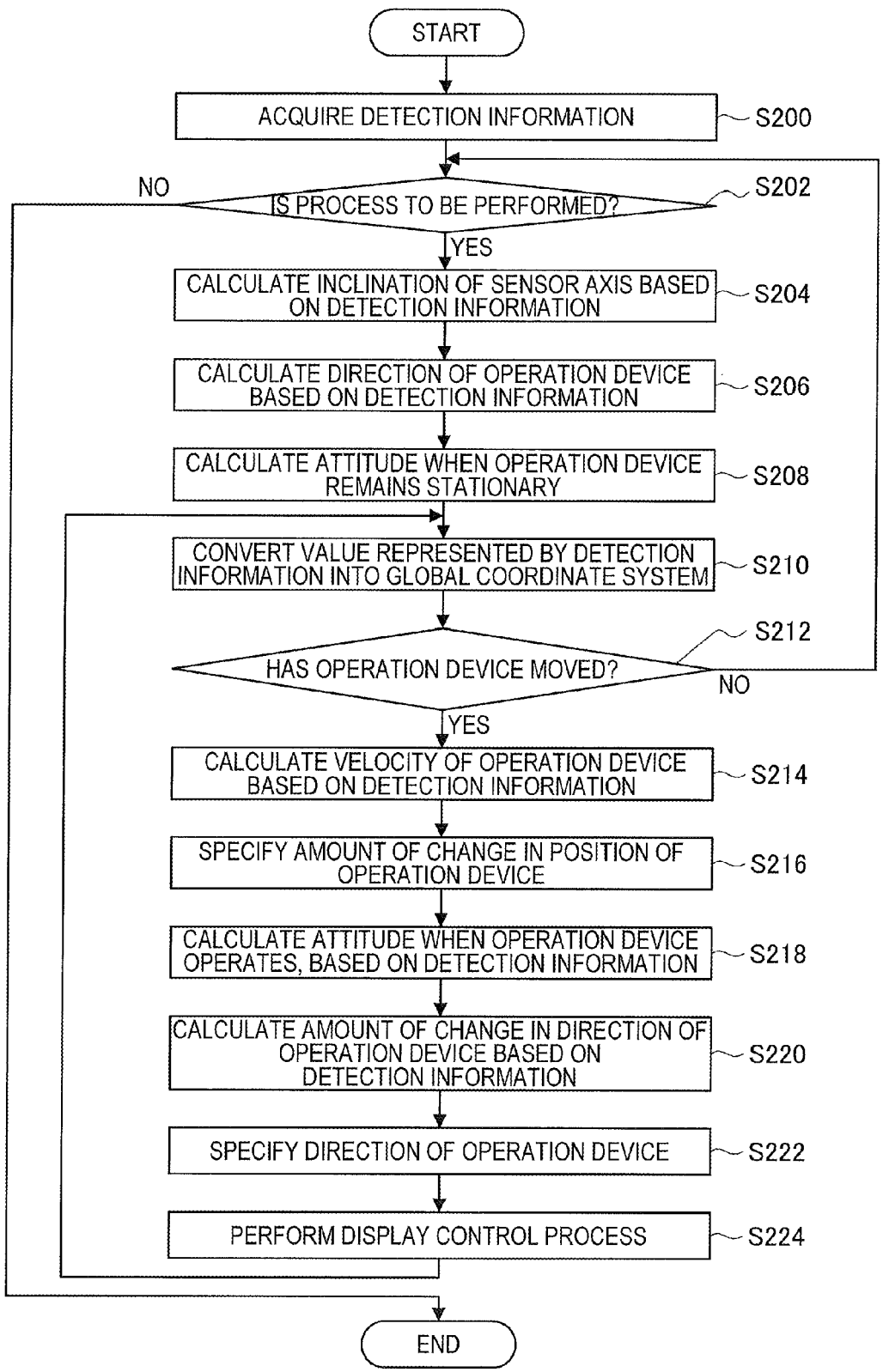
FIG. 9 is a flowchart illustrating a second example of a process related to a display control method in a display control device according to the present embodiment.

FIG. 9 is a flowchart illustrating a second example of the process related to the display control method in the display control device according to the present embodiment. Here, the processes of steps S200 to S222 illustrated in FIG. 9 corresponds to the process (the detecting process) of (1), and the process of step S224 illustrated in FIG. 9 corresponds to the process (the display control process) of (2).

Similarly to step S100 illustrated in FIG. 8, the display control device according to the present embodiment acquires detection information (S200). Although not illustrated in FIG. 9, even while step S204 and subsequent steps (which will be described later) are being performed, the display control device according to the present embodiment can acquire the detection information.

Similarly to step S102 illustrated in FIG. 8, the display control device according to the present embodiment determines whether or not the process related to the display control method according to the present embodiment is to be performed (S202). Here, when it is determined in step S202 that the process related to the display control method according to the present embodiment is not to be performed, the display control device according to the present embodiment ends the process related to the display control method according to the present embodiment. The process related to the display control method according to the present embodiment illustrated in FIG. 9 is not a process of a type that is not performed again after ending once but a process which is repeatedly performed.

However, when it is determined in step S202 that the process related to the display control method according to the present embodiment is to be performed, similarly to step S104 illustrated in FIG. 8, the display control device according to the present embodiment calculates an inclination of a sensor axis based on the detection information (S204).

Similarly to step S106 illustrated in FIG. 8, the display control device according to the present embodiment calculates a direction of the operation device based on the detection information (S206).

FIG. 9 illustrates the example in which the process of step S206 is performed after the process of step S204 but the process related to the display control method according to the present embodiment is not limited to the above example. For example, the display control device according to the present embodiment can perform the process of step S204 and the process of step S206 independently of each other. Thus, the display control device according to the present embodiment may perform the process of step S204 after the process of step S206 or may perform the process of step S204 and the process of step S206 at the same time.

Here, when the processes of steps S204 and S206 are completed, similarly to step S108 illustrated in FIG. 8, the display control device according to the present embodiment calculates an attitude when the operation device remains stationary (S208).

Here when the frame matrix representing the attitude when the operation device remains stationary is calculated in step S208, similarly to step S110 illustrated in FIG. 8, the display control device according to the present embodiment converts various values represented by the detection information acquired in step S200 into the global coordinate system (S210).

Here, when the process of step S210 is completed, similarly to step S112 illustrated in FIG. 8, the display control device according to the present embodiment determines whether or not the operation device has moved (S212). Here, when it is determined in step S212 that the operation device has not moved, the display control device according to the present embodiment repeats the process from step S202.

However, when it is determined in step S212 that the operation device has moved, the display control device according to the present embodiment calculates the velocity of the operation device based on the detection information (S214). Here, the display control device according to the present embodiment calculates the velocity of the operation device (more specifically, the velocity of the operation device in the global coordinate system), for example, by integrating values obtained by converting values (for example, the detection value of the acceleration sensor) representing acceleration included in the detection information into the global coordinate system.

When the process of step S214 is performed, the display control device according to the present embodiment specifies an amount of change in position of the operation device (S216). Here, the display control device according to the present embodiment calculates a moving distance of the operation device in the global coordinate system, for example, by integrating the velocity of the operation device in the global coordinate system calculated in step S214, and uses the calculated moving distance of the operation device as an amount of change in position of the operation device.

Similarly to step S114 illustrated in FIG. 8, the display control device according to the present embodiment calculates an attitude when the operation device operates based on the detection information (S218).

Similarly to step S116 illustrated in FIG. 8, the display control device according to the present embodiment calculates an amount of change in direction of the operation device based on the detection information (S220).

FIG. 9 illustrates the example in which the processes of steps S218 and S220 are performed after the process of steps S214 and 216, but the process related to the display control method according to the present embodiment is not limited to the above example. For example, the display control device according to the present embodiment can perform the process of steps S214 and S216, the process of step S218, and the process of step S220 independently of one another. Thus, the display control device according to the present embodiment may perform the process of steps S214 and S216, the process of step S218, and the process of S220 at the same time or may perform the processes in an arbitrary order.

When the processes of step S218 and S220 are completed, similarly to step S118 illustrated in FIG. 8, the display control device according to the present embodiment specifies the direction of the operation device (S222).

When an amount of change in position of the operation device is specified in step S216 and then the direction of the operation device is specified in step S222, the display control device according to the present embodiment performs the display control process based on the specified amount of change in position of the operation device (an example of motion of the operation device) and the specified direction of the operation device (an example of motion of the operation device) (S224). Here, the display control device according to the present embodiment generates the imaging control command corresponding to the specified amount of change in position of the operation device and the imaging control command corresponding to the specified direction of the operation device, for example, using a table in which motion of the operation device is associated with processing related to imaging control. Then, the display control device according to the present embodiment controls display of an image obtained through an imaging operation by transmitting the generated imaging control command to the external device connected via a network (or directly) in a wired/wireless manner and causing the external device to execute the imaging control command. The display control device according to the present embodiment may generate, for example, an imaging control command corresponding to a combination of the specified amount of change in position of the operation device and the specified direction of the operation device.

Then, the display control device according to the present embodiment repeats the process from step S210.

The display control device according to the present embodiment can implement the display control method according to the present embodiment (the process (the detecting process) of (1) and the process (the display control process) of (2)), for example, by performing the process illustrated in FIG. 9. Thus, for example, by performing the process illustrated in FIG. 9, the display control device according to the present embodiment can control an imaging operation in the external device based on motion of the operation device and control display of an image obtained through an imaging operation.

3. Another Example

The above description has been made in connection with the example in which an example of the process of detecting "(a) the direction of the operation device" and performing display control is performed as the process related to the first example of the display control method according to the present embodiment, and an example of the process of detecting "(c) the direction of the operation device and an amount of change in position of the operation device" and performing display control is performed as the process of the second example of the display control method according to the present embodiment. However, the process related to the display control method according to the present embodiment is not limited to the process related to the first example and the process related to the second example.

For example, in the processes illustrated in FIGS. 8 and 9, the display control device according to the present embodiment may further calculate an amount of change in direction of the operation device and generate an imaging control command based on the calculated amount of change in direction of the operation device. In addition, for example, in the processes illustrated in FIGS. 8 and 9 or the process of further calculating an amount of change in direction of the operation device, the display control device according to the present embodiment may further generate an imaging control command based on a pressure value that changes according to the user's operation.

Display Control Device According to Present Embodiment

Next, an example of a configuration of the display control device according to the present embodiment which is capable of performing the process related to the display control method according to the present embodiment will be described.

Figure 10:
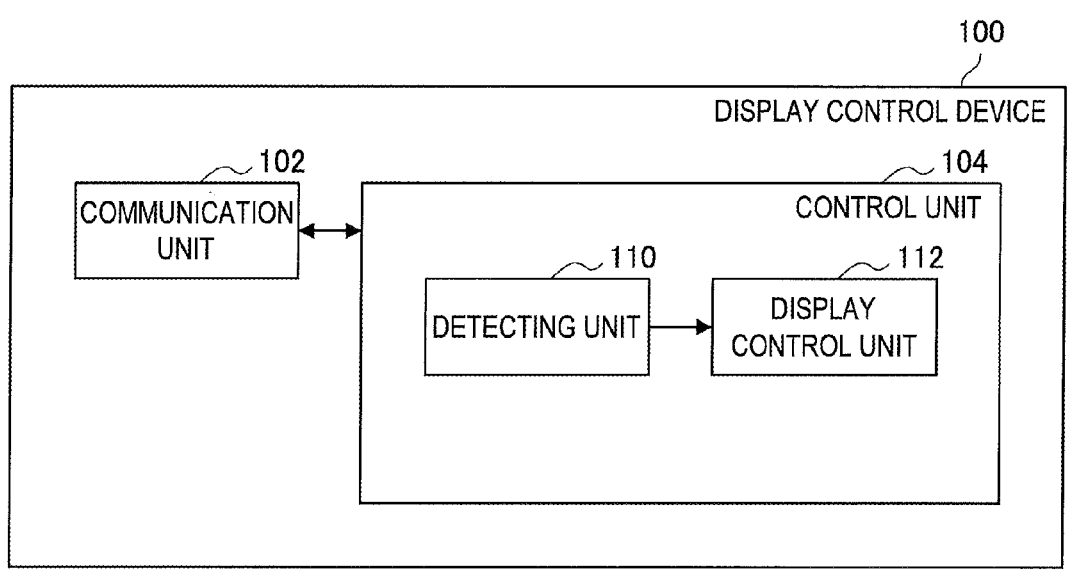
FIG. 10 is a block diagram illustrating an example of a configuration of a display control device according to the present embodiment.

FIG. 10 is a block diagram illustrating an example of a configuration of the display control device 100 according to the present embodiment. The display control device 100 includes, for example, a communication unit 102 and a control unit 104.

For example, the display control device 100 may include a read only memory (ROM) (not shown), a random access memory (RAM) (not shown), a storage unit (not shown), an operating unit (not shown) operable by the user, a display unit (not shown) that displays various screens on a display screen, and the like. For example, the display control device 100 connects the above-mentioned components to one another through a bus serving as a data transmission path.

Here, the ROM (not shown) stores a program, control data such as a calculation parameter, and the like which are used by the control unit 104. The RAM (not shown) temporarily stores a program executed by the control unit 104.

The storage unit (not shown) is a storage device installed in the display control device 100, and stores various kinds of data such as image data or an application. Here, examples of the storage unit (not shown) include a magnetic recording medium such as a hard disk and a non-volatile memory such as an electrically erasable and programmable read only memory (EEPROM) and a flash memory. The storage unit (not shown) may be removably attached to the display control device 100.

An operation input device which will be described later may be used as the operating unit (not shown). A display device which will be described later may be used as the display unit (not shown).

Example of Hardware Configuration of Display Control Device 100

Figure 11:
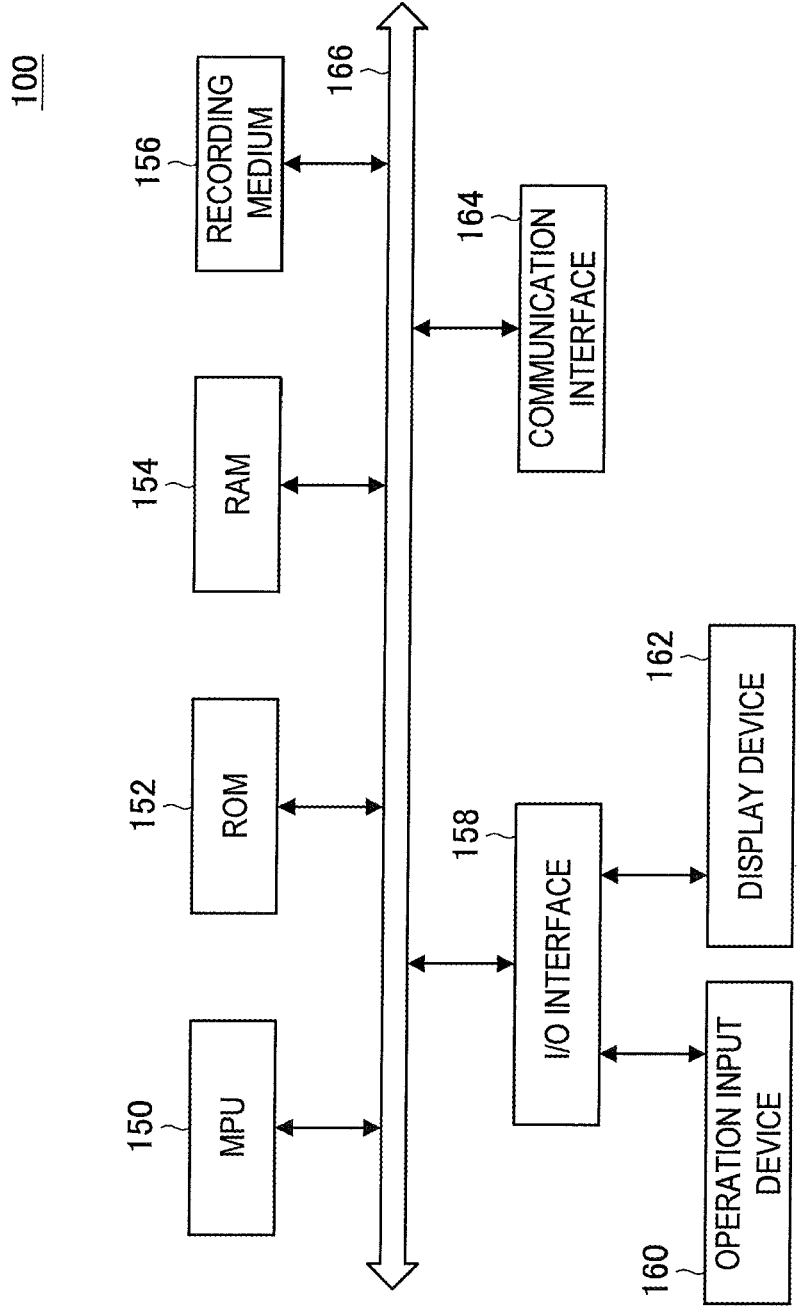
FIG. 11 is an explanatory view illustrating an example of a hardware configuration of a display control device according to the present embodiment.

FIG. 11 is an explanatory view illustrating an example of a hardware configuration of the display control device 100 according to the present embodiment. For example, the display control device 100 includes an MPU 150, a ROM 152, a RAM 154, a recording medium 156, an input/output (I/O) interface 158, an operation input device 160, a display device 162, and a communication interface 164. For example, the display control device 100 connects the components through a bus 166 serving as a data transmission path.

For example, the MPU 150 is configured with a micro processing unit (MPU) or various kinds of processing circuits, and serves as the control unit 104 that controls the display control device 100 in general. For example, the MPU 150 undertakes a detecting unit 110 and a display control unit 112 which will be described later in the display control device 100.

The ROM 152 stores a program, control data such as a calculation parameter, and the like which are used by the MPU 150. For example, the RAM 154 temporarily stores a program and the like executed by the MPU 150.

The recording medium 156 serves as the storage unit (not shown), and stores various kinds of data such as image data and an application. Here, examples of the recording medium 156 include a magnetic recording medium such as a hard disk and a non-volatile memory such as a flash memory. The recording medium 156 may be removably attached to the display control device 100.

For example, the I/O interface 158 is connected with the operation input device 160 and the display device 162. The operation input device 160 serves as the operating unit (not shown), and the display device 162 serves as the display unit (not shown). Here, examples of the I/O interface 158 includes a universal serial bus (USB) terminal, a digital visual interface (DVI) terminal, a high-definition multimedia interface (HDMI) terminal, and various kinds of processing circuits. For example, the operation input device 160 is disposed on the display control device 100 and connected with the I/O interface 158 inside the display control device 100. Examples of the operation input device 160 include a rotary selector such as a button, a directional key or a jog dial and a combination thereof. For example, the display device 162 is disposed on the display control device 100 and connected with the I/O interface 158 inside the display control device 100. Examples of the display device 162 include a liquid crystal display (LCD) and an organic EL display (an organic electroluminescence display or on organic light emitting diode (OLED) display).

Of course, the I/O interface 158 can be connected with an external device such as an operation input device (for example, a keyboard or a mouse) which is an external device of the display control device 100 or the display device. For example, the display device 162 may include a device that supports both a display and the user's operation such as a touch screen.

The communication interface 164 is a communication device disposed in the display control device 100, and serves as the communication unit 102 that performs wired/wireless communication with an external operation device or an external device such as an imaging device, a PC, and a display device through a network (or directly). Here, examples of the communication interface 164 include a combination of a communication antenna and a radio frequency (RF) circuit (wireless communication), a combination of an IEEE802.15.1 port and a transceiving circuit (wireless communication), a combination of an IEEE802.11b port and a transceiving circuit (wireless communication), and a local area network (LAN) terminal and a transceiving circuit (wired communication).

The display control device 100 performs the process related to the display control method according to the present embodiment through the configuration illustrated in FIG. 11. The hardware configuration of the display control device 100 according to the present embodiment is not limited to the configuration illustrated in FIG. 11. For example, the display control device 100 may include a plurality of communication interfaces which are of the same type or different types. For example, the display control device 100 may have a configuration that includes no operation input device 160 nor display device 162.

Further, when the display control device 100 serves as the operation device according to the present embodiment, the display control device 100 includes various kinds of sensors capable of motion of the operation device such as an acceleration sensor, an angular velocity sensor, and a magnetic sensor.

Referring back to FIG. 10, an example of the configuration of the display control device 100 will be described. The communication unit 102 is a communication device disposed in the display control device 100, and performs wired/wireless communication with an external operation device or an external device such as an imaging device, a PC, and a display device through a network (or directly). For example, the communication unit 102 controls communication through the control unit 104. Here, the communication unit 102 includes, for example, a communication antenna and an RF circuit or a LAN terminal and a transceiving circuit, but the configuration of the communication unit 102 is not limited to this example. For example, the communication unit 102 may have a configuration that supports any communication standard such as a combination of a USB terminal and a transceiving circuit or any configuration capable of performing communication with an external device via a network.

For example, the control unit 104 is configured with an MPU, and controls the display control device 100 in general. For example, the control unit 104 includes the detecting unit 110 and the display control unit 112, and plays a leading role of performing the process related to the display control method according to the present embodiment.

The detecting unit 110 plays a leading role of performing the process (the detecting process) of (1), and detects motion of the operation device based on the detection information. More specifically, for example, when the display control device 100 serves as the operation device according to the present embodiment, the detecting unit 110 detects motion of the operation device (the display control device 100) based on the detection information corresponding to detection values of various kinds of sensors included in the display control device 100 (operation device). For example, when the communication unit 102 receives the detection information transmitted from the external operation device, the detecting unit 110 detects the motion of the operation device (external operation device) based on the detection information transferred from the communication unit 102. Here, examples of the motion of the operation device detected by the detecting unit 110 include the motions (a) to (e) described above.

The display control unit 112 plays a leading role of performing the process (the display control process) of (2). More specifically, the display control unit 112 generates the imaging control command based on the direction of the operation device detected by the detecting unit 110. Then, the display control unit 112 controls display of an image obtained through an imaging operation by causing the communication unit 102 to transmit the generated imaging control command to the external device.

Here, for example, the display control unit 112 transfers the imaging control command and data representing an external device of a transmission destination of the imaging control command to the communication unit 102, and the communication unit 102 transmits the imaging control command to the external device of the transmission destination. Examples of the data representing the external device of the transmission destination of the imaging control command include data representing an external device such as an internet protocol (IP) address, a media access control address (MAC) address, and data necessary to start communication such as a personal identification number (PIN). For example, the display control unit 112 appropriately reads data representing the external device of the transmission destination of the imaging control command which is stored in the storage unit (not shown) or the ROM (not shown) out of the storage unit (not shown) or the ROM (not shown).

For example, the control unit 104 includes the detecting unit 110 and the display control unit 112 and thus plays a leading role of performing the process related to the display control method according to the present embodiment.

The display control device 100 performs the process related to the display control method according to the present embodiment (for example, the process (the detecting process) of (1) and the process (the display control process) of (2)) through the configuration illustrated in FIG. 10. Thus, the display control device 100 can control an imaging operation in the external device based on motion of the operation device and control display of an image obtained through an imaging operation through the configuration illustrated in FIG. 10. Of course, the configuration of the display control device according to the present embodiment is not limited to the configuration illustrated in FIG. 10.

As described above, the display control device according to the present embodiment performs, for example, the process (the detecting process) of (1) and the process (the display control process) of (2) as the process related to the display control method according to the present embodiment. Here, the display control device according to the present embodiment detects the motion of the operation device based on the detection information corresponding to the physical operation on the operation device in the process (the detecting process) of (1). Further, the display control device according to the present embodiment controls display of an image obtained through an imaging operation by transmitting the generated imaging control command to the external device based on the detected motion of the operation device in the process (the display control process) of (2).

Thus, the display control device according to the present embodiment can control an imaging operation in the external device based on motion of the operation device and control display of an image obtained through an imaging operation.

Further, the display control device according to the present embodiment detects the motion of the operation device from the detection information based on the user's physical operation on the operation device, and controls a isplay of an image obtained through an imaging operation by transmitting the imaging control command corresponding to the detected motion of the operation device to the external device. Thus, even when the user perform an operation without viewing an operation screen used to perform an operation, the user can control an imaging operation in an imaging device (through the display control device according to the present embodiment) and change an image (an image obtained through an imaging operation) to be displayed on the display screen. Further, the user can control an imaging operation in an imaging device (through the display control device according to the present embodiment) and cause a desired image obtained through an imaging operation to be displayed on the display screen through a more intuitive operation.

The present embodiment has been described in connection with the display control device, but the present embodiment is not limited to this embodiment. The present embodiment can be applied to various devices such as a communication device such as a portable telephone or a smart phone, a video/music reproducing device (or a video/music recording/reproducing device), a game machine, a computer such as a PC, or a display device such as a television receiver. For example, the present embodiment can be applied to an operation device operable by the user such as the operation device illustrated in FIG. 1.

Program According to Present Embodiment

Through a program (for example, a program capable of executing the process related to the display control method according to the present embodiment such as the process (the detecting process) of (1) and the process (the display control process) of (2)) causing a computer to function as the display control device according to the present embodiment, it is possible to control an imaging operation in the external device based on motion of the operation device and control display of an image obtained through an imaging operation.

It should be understood by those skilled in the art that various modifications, combinations, sub-combinations and alterations may occur depending on design requirements and other factors insofar as they are within the scope of the appended claims or the equivalents thereof.

For example, the display control device according to the present embodiment can be individually provided with the detecting unit 110 illustrated in FIG. 10 and the display control unit 112 (for example, each unit can be implemented by an individual processing circuit).

The above description has been made in connection with the example in which a program (computer program) causing a computer to function as the display control device according to the present embodiment is provided. However, in the present embodiment, a recording medium storing the program can be provided together.

The above-described configuration represents an example of the present embodiment and belongs to the technical spirit of the present disclosure, of course.

Additionally, the following configuration is also within the technical scope of the present disclosure.

(1) A display control device, including:
  a communication unit that performs communication with an external device;
  a detecting unit that detects a direction of an operation device based on detection information representing motion of the operation device; and
  a display control unit that generates an imaging control command used to control an imaging operation based on the detected direction of the operation device, and controls display of an image obtained through an imaging operation by causing the communication unit to transmit the imaging control command to the external device.

(2) The display control device according to (1),
  wherein the detecting unit further detects an amount of change in direction of the operation device, and
  the display control unit generates the imaging control command based on a result of comparing the amount of change in direction with a threshold value corresponding to the amount of change in direction.

(3) The display control device according to (1) or (2),
  wherein the detecting unit further detects an amount of change in position of the operation device, and
  the display control unit generates the imaging control command based on the detected amount of change in position.

(4) The display control device according to (3), wherein the display control unit generates the imaging control command based on a result of comparing the amount of change in position with a threshold value corresponding to the amount of change in position.

(5) The display control device according to any one of (1) to (4),
wherein the detection information includes a pressure value that changes according to a user's operation, and
the display control unit selectively generates the imaging control command based on a result of comparing the pressure value with a threshold value corresponding to the pressure value.
(6) The display control device according to any one of (1) to (5), wherein the detection information includes a value representing acceleration, a value representing an angular velocity, and a value representing magnetic strength.
(7) The display control device according to any one of (1) to (6), wherein the imaging control command is used to control an imaging operation in an imaging device.
(8) The display control device according to any one of (1) to (6), wherein the imaging control command is used to control an imaging operation in a virtual imaging device.
(9) The display control device according to (8), wherein the imaging control command is used to control an imaging operation of an image imaged in the past in the virtual imaging device.
(10) The display control device according to (8), wherein the imaging control command is used to control an imaging operation of an image drawn in a virtual space in the virtual imaging device.
(11) The display control device according to any one of (1) to (10), wherein the operation device is a spherical device which is held and used.

The present disclosure contains subject matter related to that disclosed in Japanese Priority Patent Application JP 2011-221540 filed in the Japan Patent Office on Oct. 6, 2011, the entire content of which is hereby incorporated by reference.

What is claimed is:

1. A display control device, comprising:
a communication unit that performs communication with an external device;
a detecting unit that detects a direction of motion of an operation device based on detection information representing the motion of the operation device along the direction and an amount of change in direction of the motion of the operation device along the direction; and
a display control unit that generates an imaging control command based on the detected direction of the motion of the operation device and a result of comparing the amount of change in direction of motion with a threshold value corresponding to the amount of change in direction of motion, and controls an image obtained through an imaging operation of a virtual imaging device by transmitting, via the communication unit, the imaging control command to the external device, wherein the display control unit performs a plurality of transmissions of the imaging control command to the external device when the amount of change in direction of the motion of the operation device is greater than or equal to the threshold value,
wherein the external device executes the imaging control command to control the imaging operation by the virtual imaging device.

2. The display control device according to claim 1,
wherein the detecting unit further detects an amount of change in position of the operation device, and
the display control unit generates the imaging control command based on the detected amount of change in position.

3. The display control device according to claim 2, wherein the display control unit generates the imaging control command based on a result of comparing the amount of change in position with a threshold value corresponding to the amount of change in position.

4. The display control device according to claim 1,
wherein the detection information includes a pressure value that changes according to a user's operation, and
the display control unit selectively generates the imaging control command based on a result of comparing the pressure value with a threshold value corresponding to the pressure value.

5. The display control device according to claim 1, wherein the detection information includes a value representing acceleration, a value representing an angular velocity, and a value representing magnetic strength.

6. The display control device according to claim 1, wherein the imaging control command is used to control an imaging operation of an image imaged in the past in the virtual imaging device.

7. The display control device according to claim 1, wherein the imaging control command is used to control an imaging operation of an image drawn in a virtual space in the virtual imaging device.

8. The display control device according to claim 1, wherein the operation device is a spherical device which is held and used.

9. The display control device according to claim 1, wherein the communication unit continues to transmit the imaging control command to the external device until a predetermined stop operation is performed by a user on the operation device.

10. The display control device according to claim 1, wherein the communication unit stops transmission of the imaging control command to the external device if the display control unit determines that the external device cannot perform processing corresponding to the imaging control command.

11. The display control device according to claim 1, wherein the display control unit controls display of the image on a display screen and the image displayed on the display screen changes in response to transmission of the imaging control command to the external device.

12. The display control device according to claim 11, wherein the image on the display screen changes in response to each transmission of the imaging control command to the external device.

13. The display control device according to claim 1, wherein the communication unit continues to transmit the imaging control command to the external device until a stop button is pressed.

14. The display control device according to claim 1, wherein the communication unit continues to transmit the imaging control command to the external device until it is difficult for the external device to process the imaging control command.

15. A display control device, comprising:
a communication unit that performs communication with an external device;
a detecting unit that detects a direction of motion of an operation device based on detection information representing the motion of the operation device along the direction and an amount of change in direction of the motion of the operation device along the direction; and
a display control unit that generates an imaging control command based on the detected direction of the motion of the operation device and a result of comparing the amount of change in direction of motion with a threshold value corresponding to the amount of change in direction of motion, and controls an image obtained through an imaging operation of an imaging device by transmitting, via the communication unit, the imaging control command to the external device, wherein the display control unit performs a plurality of transmissions of the imaging control command to the external device when the amount of change in direction of the motion of the operation device is greater than or equal to the threshold value, wherein the external device connects with the imaging device or the external device is the imaging device, and wherein the imaging control command is used to control an imaging operation of an image imaged in the past in a virtual imaging device.

\* \* \* \* \*